United States Patent [19]

Root

[11] 4,192,292
[45] Mar. 11, 1980

[54] SOLAR HEATING SYSTEM

[76] Inventor: Edward J. Root, P.O. Box 169, Old Saybrook, Conn. 06475

[21] Appl. No.: 890,206

[22] Filed: Mar. 27, 1978

[51] Int. Cl.$^2$ ............................................. F24J 3/02
[52] U.S. Cl. .................................... 126/448; 126/438; 126/419; 165/74; 165/76
[58] Field of Search ............... 126/270, 271; 237/1 A; 350/293, 299; 165/166, 74, 171, 76, 172

[56] References Cited
U.S. PATENT DOCUMENTS

| | | | |
|---|---|---|---|
| 4,048,983 | 9/1977 | Pei | 126/271 |
| 4,066,062 | 1/1978 | Houston | 237/1 A |
| 4,069,810 | 1/1978 | Tabor | 237/1 A |
| 4,094,300 | 6/1978 | Young | 126/271 |

*Primary Examiner*—James C. Yeung
*Attorney, Agent, or Firm*—Albert W. Hilburger

[57] ABSTRACT

A solar heating system for a structure in which a matrix of beverage containers of the convenient opening variety is mounted on a generally flat support member. The beverage containers extend through holes in the support member formed from alternating polygons of a generally checkerboard surface design. A resilient plug seals the opening at one end of each container and a pair of collector tubes extend through the plug into the interior of each container. The collector tubes of adjacent containers are connected together such that all containers are connected in a series relationship. Those surface areas of the support member not occupied by the containers are contoured and have an outer surface appropriate to reflect heat and light toward the containers which themselves have a coating of a heat and light conductive substance. Fluid is pumped from a reservoir and through the containers under sunny conditions or may be diverted from the matrix during cloudy conditions or at night. In the latter events, an insulated canopy may be extended to cover the matrix. The amount of heat taken from the system to heat the structure may also be appropriately controlled.

8 Claims, 7 Drawing Figures

SOLAR HEATING SYSTEM

BACKGROUND OF THE INVENTION

1. Field of the Invention

The present invention relates generally to new and approved solar heating systems and, particularly, to such a system which utilizes a novel collector matrix incorporating discarded beverage containers as a primary component thereby resulting in additional benefits in an ecological sense.

2. Description of the Prior Art

In recent years energy has come to a very high priority in our society. Our fossil fuels are diminishing at a very rapid rate and the reserves of natural gas and coal and oil will be exhausted in the not too distant future unless alternative modes of energy are devised and put into use. Scientists, economists, and other private and governmental experts have expressed their concern at an ever increasing rate and are urging that we press forward with effective programs aimed at conserving our present resources and promoting new forms of energy.

One of the more promising forms of energy which is currently being considered is solar energy whereby mankind can tap for immediate use that seemingly inexhaustable source of our light and heat, the sun. The concept of tapping the sun's energy is an old one indeed, but the hardware for making this concept a reality has lagged far behind the dreams. The known systems have often been complex and expensive to place into operation, many times because they employed materials which are expensive or are not readily obtainable. In many instances, the systems which were devised were not readily adaptable to existing structures so that it was actually necessary to design a structure around the solar energy system. Solar heat collectors of the known variety were often glass faced pans or tubes which, by reason of the refractive index of glass, would tend to reflect much of the light away from the object to be heated. Other designs incorporated corrugated metal, copper tubes, and complex fittings in those instances where a series of substantially parallel tubular collectors were connected in series at their respective ends. On occasion these were known to be difficult to install and maintain, and as a result, often tended to dissuade potential users away from the solar heating concept.

SUMMARY OF THE INVENTION

A solar heating system is presently disclosed for a structure which avoids many of the drawbacks of these earlier designs. To this end, a matrix of beverage containers, preferably of the aluminum variety, is mounted on a generally flat support member. The particular style of beverage containers utilized is preferably that employing convenience opening devices such as those commonly sold under the trademarks "Pop-Top", "E-Z Open", and "Flip-Top", among others. In short, it is preferred to use those containers which do not require an external or separate opening device to gain access to their contents. However, it is within the purview of the invention to utilize conventional beverage containers and form an appropriate opening at one end similar in shape and size to the openings which result following use of the convenience opening style container. In any event, the concept of the invention is to employ containers which have been used but which remain in reasonably acceptable condition for the purposes which are to be described herein. Such containers would be thoroughly washed and suitably provided with an outer coating of a heat and light conductive substance. A resilient plug seals the opening at one end of each container which results after removal of the convenience opening device and a pair of collector tubes extend through the plug into the interior of each container. The collector tubes of adjacent containers are connected together such that all containers are connected in a series relationship. Those surface areas of the support member not occupied by the containers are contoured and have an outer surface appropriate to reflect heat and light in the direction of the containers. Fluid is pumped from a reservoir and through the containers under sunny conditions or may be diverted from the matrix during cloudy conditions or at night. In the latter events, an insulated canopy may be extended to cover and protect the matrix. The amount of heat taken from the system to heat the structure may also be appropriately controlled.

The invention, as disclosed, is of simplified construction and, therefore, economical to construct and maintain. The invention is highly desirable from an ecological standpoint in that it utilizes discarded containers and existing, low cost materials throughout its construction. Individual solar heat collector units, or containers, within the matrix are readily removable and replaceable as necessary. Furthermore, the invention is readily adaptable to existing structures and existing heating systems, whether they relate to homes, commercial buildings, industrial buildings, or other types of structures. Additionally, were the invention to be adapted to an existing structure with a conventional heating system, it would only be necessary to add to the existing structure a collector matrix, a fluid reservoir, a fluid line to bypass the collector matrix during periods of cloudiness or at nighttime, appropriate valves to accomplish this end, and a sensing device responsive to sunlight to activate the valves.

The present invention may also be employed with other developments in the solar energy field. One such innovation is the use of heliostats which are large, nominally flat, two-axis tracking mirrors which can be used to hold the image of the sun continuously stationary on an elevated absorbing receiver or matrix of solar energy collectors. Such collectors may be of the form and construction disclosed herein.

It is to be understood that the both foregoing general description and the following detailed description are exemplary and explanatory but are not restrictive of the invention.

The accompanying drawings, which are incorporated in, and constitute a part of this invention, utilize like numerals to refer to like parts throughout, and together with the description serve to explain the principles of the invention.

DETAILED DESCRIPTION OF THE DRAWINGS

DESCRIPTION OF THE PREFERRED EMBODIMENTS

Figure 1:
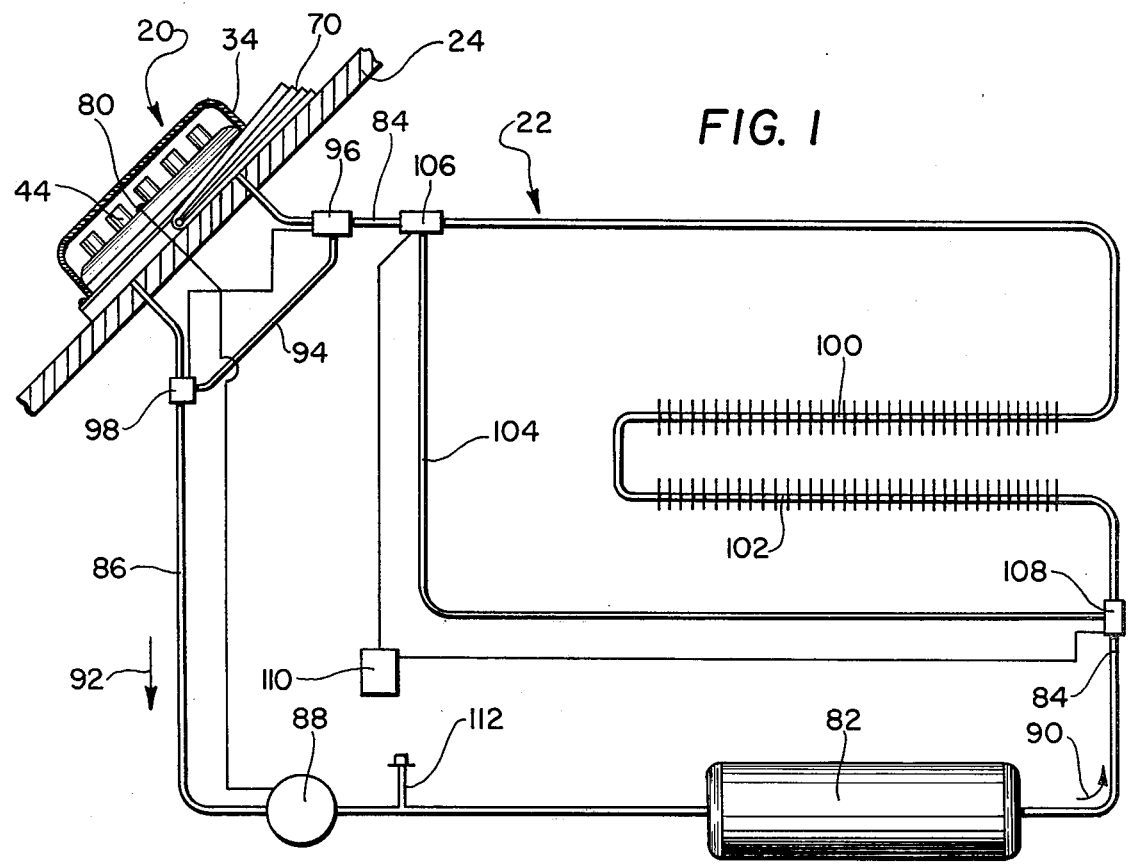
FIG. 1 is a schematic diagram of a solar heating system embodying the principles of the invention, including a side elevation view, partly cut away and in section, illustrating the roof of a house employing such a system.

Refer now to the drawings, and initially to FIG. 1, which illustrates a system embodying the principles of the present invention. In FIG. 1, a solar collector matrix assembly 20 and an accompanying fluid flow heating system 22 operate in combination to heat the interior of a structure represented by reference numeral 24. The structure may be, for example, a house, an office building, or an industrial building. It is preferable that the matrix assembly 20 on the roof of the structure 24 be generally directed toward the path of the sun as it arcs across the sky from sunrise to sunset. Thus, in the northern hemisphere, it would be preferable for the collector matrix assembly 20 to be positioned facing a southerly direction.

In accordance with the invention, the solar heating system comprises a support member of generally flat sheet material having a substantially checkerboard design on its surface, alternating polygons thereof having circular holes formed therein whose outer circumferences are generally tangential to the perimeters of their associated polygons. As embodied herein, with particular reference to FIGS. 2 and 3, a support member 26 is shown (FIG. 3) overlying a sheet 28 of suitable insulating material. The insulating sheet 28, in turn, is supported around its periphery on one extremety of a flanged member 30 and in a spaced relationship and generally parallel with the roof of the structure 24. An opposite extremety of the flanged member 30 may be secured to the roof of the structure 24 at spaced locations by means of bolts 32 or other suitable fastening devices. The support member 26 and its associated insulating sheet 28 may be retained in position and held against lateral movement by means of a cover 34 which is mounted at spaced locations around its base to the flanged member 30 by means of screws 36. The cover 34 is preferably fabricated of a transparent high strength material of the type commonly sold under the trademark "Plexiglass".

Figure 2:
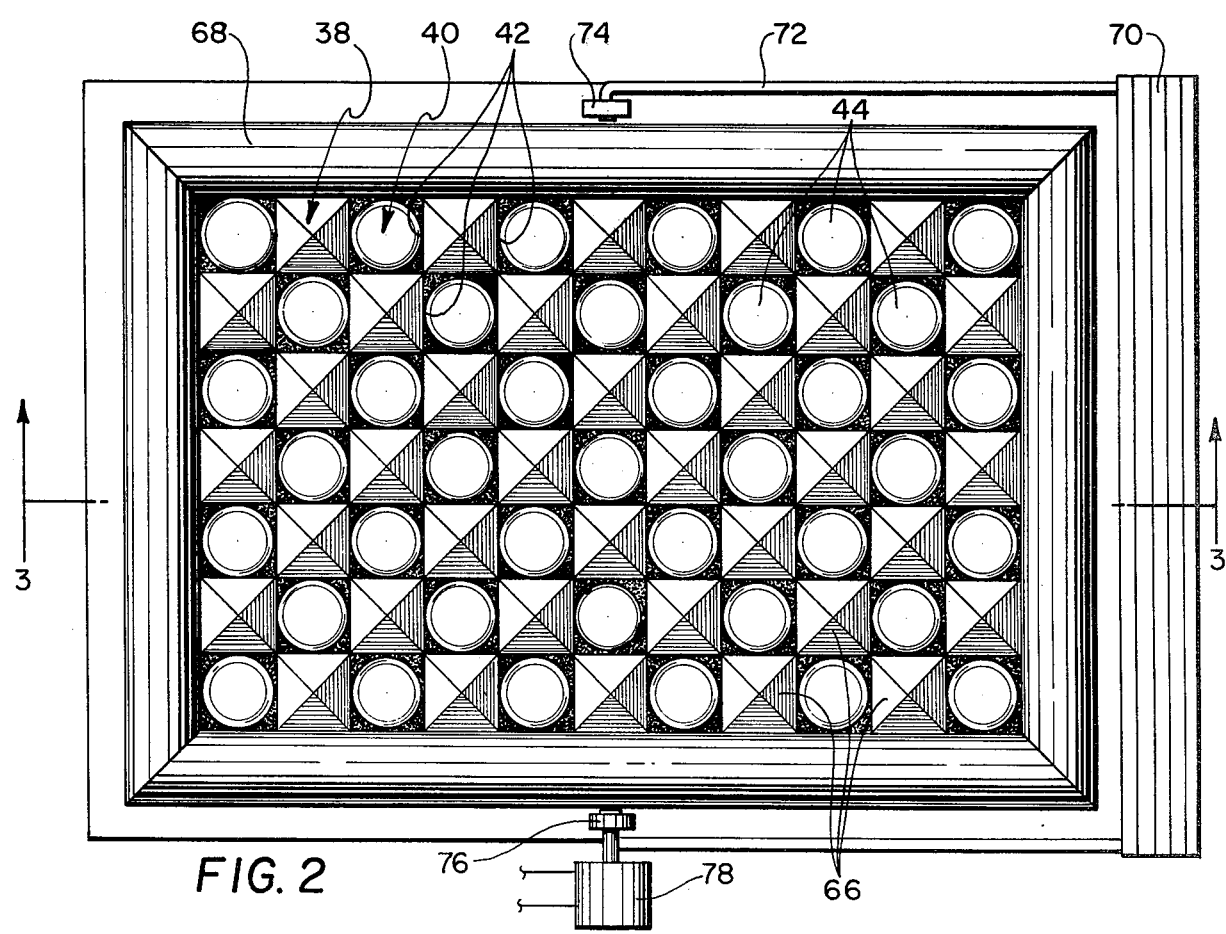
FIG. 2 is a top plan view of a solar heat collection matrix embodying the principles of the invention.

Viewing FIG. 2, the support member 26 is seen to have a substantial checkboard design on its surface, of polygons generally indicated by reference numerals 38 and 40. The polygons 38 and 40 may be of regular shape or irregular shape and alternating polygons 40 are formed with circular holes 42 having an outer circumference generally tangential to the perimeters of their associated polygons 40. Describing the arrangement in a different manner, the polygons 38 and the polygons 40 are in adjacent and alternating rows when viewed on the diagonal (see FIG. 2).

In accordance with the invention, a matrix of collector elements is arranged on said support member in a series relationship including a plurality of cylindrical beverage containers of the convenient opening variety, each including a first end which is sealed and a second end having an opening therein, each of said containers being received within an associated hole and mounted on said support member, a longitudinal axis of each of said containers being transverse to a plane of said support member, and each of said containers having a coating of heat and light conductive substance. As embodied herein, the plurality of cylindrical beverage containers 44 may be fittingly received through the circular holes 42 formed in the support structure 26. Thus, it is preferable that the diameter of the holes 42 be slightly smaller than the diameter of the container. The beverage containers are of the convenient opening variety commonly used for beer and soda pop, and each container includes a first end 46 which is sealed and a second end 48 which has an opening 50 which results when the convenient opening device has been removed. It will be appreciated that a primary concept of the invention is to utilize beverage containers 44 which have been used previously as beverage containers and then discarded. In keeping with this concept, such discarded containers are retrieved and those which are in acceptable condition are washed and otherwise prepared for use as an element in the solar collector matrix assembly 20. Of course, it may be found desirable to employ new beverage containers or even specially maunfactured cylinders which have the general characteristics of the containers 44.

Figure 3:
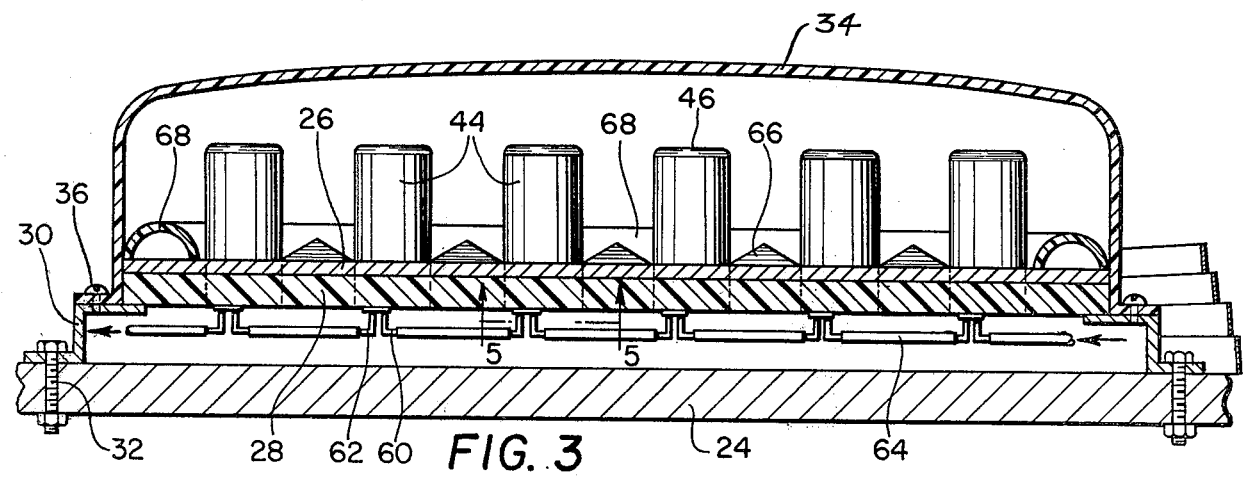
FIG. 3 is a cross section view taken generally along line 3—3 in FIG. 2.
Figure 5:
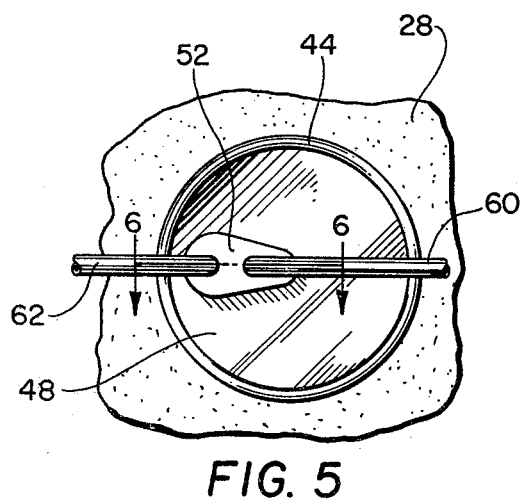
FIG. 5 is a bottom elevation view taken generally along line 5—5 in FIG. 3.

With the containers 44 positioned in the manner illustrated in FIG. 3, their longitudinal axis are transverse to a plane of the support member 26 and, indeed, are preferably perpendicular to the plane of the support member. With the containers thus extending through the circular holes 42 of the support member 26, their first ends 46 are positioned above an upper surface of the support member 26 and their lower ends 48 are positioned below a lower surface of the support member 26. After an operation of cleaning the beverage containers 44, but before mounting them on the support member 26, they are coated, in any suitable fashion, with a preferably flat, dark, heat and light conductive, and corrosion resistent paint or other coating. One such coating which has been found acceptable is flat red-iron oxide such as is sold under the trademark "Krylon".

In accordance with the invention, a resilient plug having a pair of spaced apertures is mounted in the opening of said second end of said beverage container effectively sealing the opening therein; and first and second collector tubes are fittingly received respectively through the apertures in said plug and extend from outer ends positioned at locations outside of said container to inner ends positioned at locations within said container, the inner end of said first collector tube terminating nearer to the first end of said container than the inner end of said second collector tube; and a conduit connecting said second tube of one of said containers to said first tube of an adjacent one of said containers such that all of said containers in said matrix are thereby connected in a series relationship. As embodied therein, a resilient plug 52, which may be of rubber or other suitable pliable material, is oversized relative to the opening 50 in the second end 48 of the beverage container 44 but generally conforming to the shape of the opening. The plug 52 is provided with a groove 54 about its perimeter which suitably engages the opening 50 to hold the plug 52 in place so that it effectively seals the opening 50 and thereby the interior of the container 44 from the exterior. A pair of spaced apertures 56 and 58 extend through the plug 52 and fittingly receive, respectively, a first collector tube 60 and a second collector tube 62. Each of the collector tubes extend from outer ends positioned at locations outside of container 44 to inner ends positioned at locations within the container, and the inner end of the first collector tube 60 terminates nearer to the first end 46 of the container than that of the second collector tube 62. A conduit 64, which may be composed of flexible tubing, for example, connects the second tube 62 of each of the containers 44 to the first tube 60 of its adjacent container 44 such that all of the containers in the matrix (see FIG. 2) are thereby connected in a series relationship.

In accordance with the invention, the solar collector matrix assembly 20 includes a plurality of first reflectors having an outer contour generally of pyramid shape at locations of alternating polygons on the surface of said support member, each of said first reflectors having a surface which is reflective of heat and light and arranged and positioned for directing the solar radiation towards said containers. As embodied herein, continuing to view FIGS. 2 and 3, a first reflector 66 is mounted on the upper surface of the support member 26 coextensive with each polygon 38 intermediate the circular holes 42. As illustrated, each first reflector 66 is of pyramid shape and may be, for example, of highly polished metal or of plastic provided with a suitable highly reflective upcoating on its outer surfaces. Each of the first reflectors 66 is fixed in position on the upper surface of the support member 26 by means of adhesive or some other suitable fastening mechanism. The outer surfaces of the first reflectors 66 assume predetermined angles to assure that a maximum of solar radiation will be directed toward the containers 44.

In accordance with the invention, the solar collector matrix assembly 20 includes second reflectors of a rounded outer contour mounted to said support member adjacent to its periphery for directing solar radiation toward said containers. As embodied herein, also viewing FIGS. 2 and 3, are border or second reflectors 68 which may, for example, be fabricated from appropriate tubing split along a plane passing through its longitudinal axis so as to have a rounded outer contour. The second reflectors 68 are appropriately mounted to the support nmember 26 around its periphery adjacent an outer wall of the cover 34. As with the first reflectors 66, the second reflectors 68 are fashioned to assure that they direct a maximum amount of solar radiation toward the containers 44.

Figure 7:
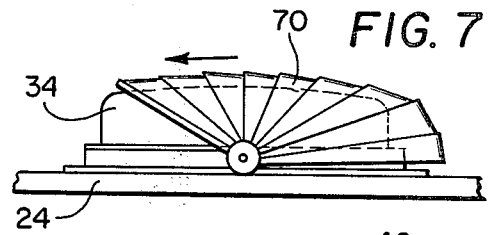
FIG. 7 is a side elevation view, similar to FIG. 3, illustrating an intermediate position of a protective canopy.
Figure 6:
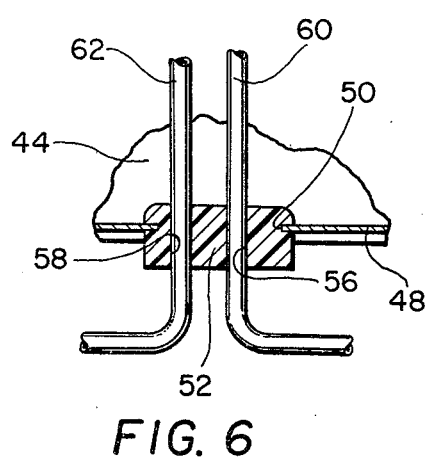
FIG. 6 is a detail cross section view taken generally along line 6—6 in FIG. 5.
Figure 4:
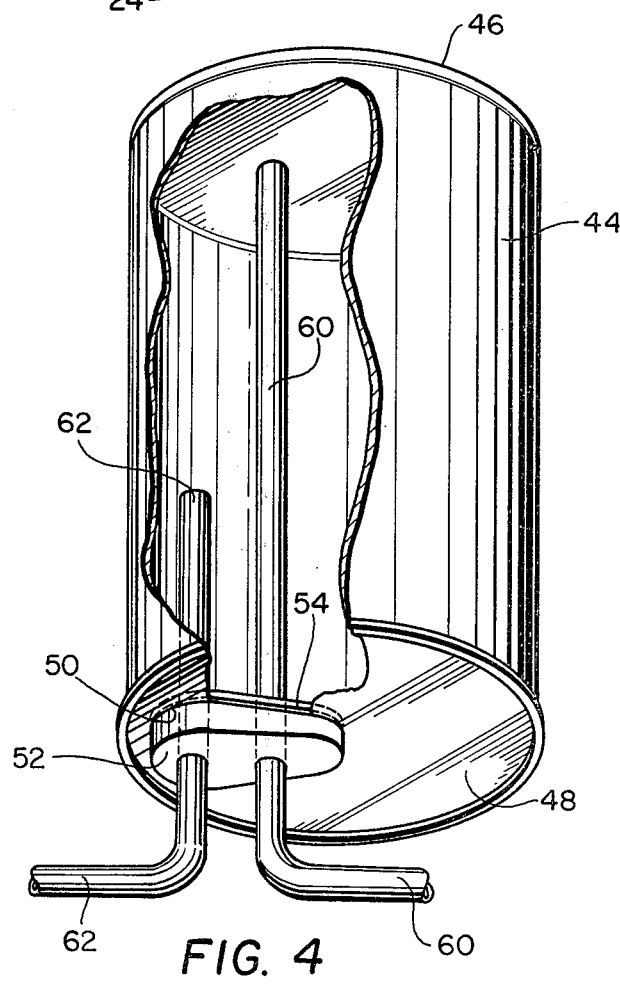
FIG. 4 is a detail view in perspective, certain parts being cut away and in section, illustrating a component of the invention.

In accordance with the invention, a solar collector matrix assembly includes a canopy mounted on said support member movable between a retracted position exposing to solar radiation said collector elements and said first and second reflectors and an extended position covering said collector elements and said first and second reflectors; drive means operatively connected with said canopy; and first sensing means responsive to the quality of solar radiation for energizing said drive means to move said canopy to the retracted position when the solar radiation received at said matrix is in excess of a predetermined value and for energizing said drive means to move said canopy to the retracted position when the solar radiation received at said matrix is less than a predetermined value. As embodied herein, particular reference being made to FIGS. 1, 2, and 7, a canopy 70 of retractable design having insulating qualities when in its extended position, includes a plurality of arms 72 which radiate from and are rotatably mounted on appropriate bearings 74 and 76 mounted on opposite sides of the matrix assembly and midway along its length. When the canopy 70 is at its retracted position (see FIGS. 1 and 2), it exposes to solar radiation the collector elements or containers 44 together with the first reflectors 66 and the second reflectors 68. In its extended position, partially illustrated in FIG. 7, the canopy overlies the cover 34 together with the collector elements or containers 44, the first reflectors 66, and the second reflectors 68.

If desired, a motor 78 may be suitably connected to the arms 72 to drive the canopy 70 between its retracted and extended positions. A first sensor 80, of a type commercially available, such as Honeywell #C773 or Poly Paks #92CU3521, is preferably mounted in any appropriate manner on the upper surface of the support member 26. The first sensor 80 is responsive to the quality of solar radiation and may be appropriately connected in a manner not shown to the motor 78 so as to energize the motor to move the canopy 70 to the retracted position when the solar radiation received by the sensor is in excess of a predetermined value. Likewise, when the solar radiation received at the sensor 80 is less than a predetermined value, it can energize the motor 78 to move the canopy 70 to the retracted position.

In accordance with the invention, the solar heating system includes a reservoir for storing a fluid therein; a fluid supply line connects the said reservoir and a first of said collector tubes at a first of said containers in said matrix; a fluid return line connects said reservoir to a second of said collector tubes at a last of said containers in said matrix; and pump means are provided for circulating the fluid from said reservoir through said system and for return to said reservoir. As embodied herein, with particular attention to FIG. 1, the fluid flow heating system 22 includes a suitably insulated storage tank or reservoir 82 connected by means of a fluid supply line 84 and a fluid return line 86 to the solar collector matrix assembly 20. To this end, the fluid supply line 84 is connected to the first collector tube 60 of the first container 44 in the matrix assembly 20. Similarly, the fluid return line 86 is connected to the second collector tube 62 of a last container 44 in the matrix 20. A pump 88, in a series relationship with the reservoir 82, the fluid supply line 84, and the fluid return line 86, operates in a customary fashion to cause flow of fluid in the direction of arrows 90 and 92. The pump 88, therefore, serves to circulate the heat transfer fluid which may be, for example, a mixture of water and anti-freeze or other suitable heat transfer agent, from the reservoir 82 through the system and for its subsequent return to the reservoir.

In accordance with the invention, the solar heating system includes a first fluid by-pass line connected at its opposite ends to said fluid supply line and to said fluid return line, respectively, said first by-pass line being in a parallel flow relationship with said matrix; a first valve operatively joining said first by-pass line and said supply line movable between a first position connecting said supply line to said matrix while disconnecting said first by-pass line from said supply line, and a second position connecting said supply line to said first by-pass line while disconnecting said matrix from said supply line; a second valve spaced from said first valve operatively joining said first by-pass line and said return line and movable between a first position connecting said matrix to said return line while disconnecting said first by-pass line and said return line, and a second position connecting said first by-pass line to said return line while disconnecting said matrix from said return line; and wherein said first sensing means is responsive to the quality of solar radiation for moving said first and second valves to their first positions when the solar radiation received at said matrix is in excess of a predetermined value and for moving said first and second valves to their second positions when the solar radiation received at said matrix is less than a predetermined value.

As embodied herein, with particular attention once again to FIG. 1, a first fluid by-pass line 94 positioned generally in parallel with the matrix assembly 20, is connected at opposite ends, respectively, to the fluid supply line 84 at a first two-way valve 96 and at its opposite end to the fluid return line 86 at a second two-way valve 98. The first valve 96 is movable between a first position connecting the supply line 84 to the matrix system 20 while disconnecting the first by-pass line 94 from the supply line, and a second position connecting the supply line 84 to the first by-pass line 94 while disconnecting the matrix system 20 from the supply line 84.

In a similar manner, the second valve 98 is movable between a first position connecting the matrix system 20 to the return line 86 while disconnecting the first by-pass line 94 from the return line, and a second position connecting the first by-pass line 94 to the return line 86 while disconnecting the matrix system 20 from the return line. Furthermore, as previously described, the first sensor 80 is responsive to the quality of solar radiation and is operatively connected to the valves 96 and 98 to cause them to move to their first positions when the solar radiation received at the matrix system 20 is in excess of a predetermined value and to cause the first and second values to move to their second positions when the solar radiation received at the matrix system 20 is less than a predetermined value. It will be appreciated that the predetermined value of solar radiation in each instance will be determined by the amount of the heat required at the reservoir 82 to heat the structure and that this value is in direct proportion to the amount of sunlight received at the first sensor 80.

In accordance with the invention, the fluid flow heating system 22 includes radiating means connected in a series relationship with said fluid supply line between said reservoir and said matrix; a second fluid by-pass line in a parallel relationship with said radiating means; third and fourth valves operatively joining at spaced locations said second by-pass line and said radiating means to said supply line, said third and fourth valves being movable between a first position connecting said radiating means to said supply line in a series relationship between said matrix and said reservoir while disconnecting said second by-pass line from said supply line, and a second position connecting said second by-pass line to said supply line in a series relationship between said matrix and said reservoir while disconnecting said radiating means from said supply line; and second sensing means responsive to air temperature within the structure for moving said third and fourth valves to their first position when the ambient temperature within the structure is below a predetermined value and for moving said third and fourth valves to their second position when the ambient temperature within the structure is above a predetermined value.

As embodied herein, once again with particular attention to FIG. 1, a pair of radiators 100 and 102 are illustrated schematically as being connected in a series relationship with the fluid supply line 84 between the reservoir 82 and the matrix assembly 20. A second fluid by-pass line 104 assumes a parallel relationship with the radiators 100 and 102 with a third two-way valve 106 and a fourth two-way valve 108, respectively, joining the second fluid by-pass line 104 to the fluid supply valve 84 at spaced locations beyond the extremities of the radiators 100 and 102. The third and fourth valves 106 and 108 are movable between a first position which connects the radiators 100 and 102 to the supply line 84 in a series relationship between the reservoir 82 and the matrix assembly 20 while disconnecting the second by-pass line 104 from the supply line, and a second position connecting the second by-pass line 104 to the supply line 84 in a series relationship between the matrix assembly 20 and the reservoir 82 while disconnecting the radiators 100 and 102 from the supply line 84.

A second sensor 110, of a type commercially available, such as Honeywell #7412 or C & M Systems Solar Stat, is responsive to air temperature within the structure being heated and is operatively connected to the valves 106 and 108 so as to cause them to move to their first position when the ambient temperature within the structure is below a predetermined value and for moving them to their second position when the ambient temperature within the structure is above a predetermined value. In this fashion, the second sensor 110 operates much as a conventional thermostat to regulate the temperature within the structure. In order to assure the safety of the heating system 22, a bleed or pressure release valve 112 may be provided either in the fluid supply line 84 or in the fluid return line 86 (as shown). The valve 112 would be effective to release the fluid at such time that the pressure within the system exceeds some predetermined value.

In operation, then, after the heating system 22 has been filled to near capacity with a water and anti-freeze fluid mixture, the pump 88 is activated to circulate the fluid from the reservoir. 82 through the matrix assembly 20 and for return to the reservoir. The fluid is thus drawn through the first collector tube 60 into each container 44. As the fluid level in each container builds, the pressure in the system assures flow of the fluid out of the container 44 through the second collector tube 62 and its associated conduit 64 into the collector tube 60 of its neighboring container 44 and so on through the entire matrix assembly 20 for eventual return via the fluid return line 86 to the reservoir 82. It will be noted that the difference in lengths of the collector tubes 60 and 62 is for the purpose of facilitating the flow of fluid through the matrix by taking advantage of the conviction currents in the fluid which result from absorbtion of the sun's rays by each container 44.

Solar energy is absorbed by the darkened containers 44 to heat the fluid contained within them. After the liquid reaches a comfort range temperature, the first sensor 80 continues to activate the pump 82 to slowly circulate the fluid through the containers 44, the return line 86, the reservoir 82, the radiators 100 and 102, and back into the containers 44, thus completing the cycle. As long as a second sensor detects comfort range temperature within the structure, the pump 88 continues to circulate the fluid through the radiators 100 and 102. However, when the internal temperature rises above the comfort range, the second sensor is effective to operate the valves 106 and 108 to by-pass the radiators 100 and 102. In the same manner, when the internal temperature of the structure drops below a predetermined level, the sensor 110 activates the valves 106 and 108 to direct fluid flow once again through the radiators 100 and 102.

When the sun intensity decreases below a predetermined level, the first sensor 80 is effective to operate the motor 78 to close the insulated canopy 70 and open the collector by-pass valves 96 and 98 to prevent continued flow of the fluid through the matrix assembly 20. With the matrix assembly 20 thus closed, the heat of the fluid in the reservoir 82 is still sufficient to heat the structure through the radiators 100 and 102 for a substantial length of time. However, during long periods without sunlight, the reservoir 82 could be electrically heated (not shown) or heated in some other fashion.

The invention, then, in its broader aspects, is not limited to the specific details shown and described, and departures may be made from such details without departing from the principles of the invention, and without sacrificing its chief advantages.

What is claimed is:

1. A solar collector matrix assembly comprising:
   a support member of generally flat sheet material having a substantially checkerboard design on its surface, alternating polygons thereof having circular holes formed therein whose outer circumferences are generally tangential to the perimeters of their associated polygons;
   a matrix of collector elements arranged on said support member in a series relationship including a plurality of cylindrical beverage containers of the convenient opening variety, each including a first end which is sealed and a second end having a continuous edge defining an opening therein, each of said containers being received within an associated hole and mounted on said support member, a longitudinal axis of each of said containers being transverse to a plane of said support member, and each of said containers having a coating of a heat and light conductive substance;
   a resilient plug having a pair of spaced apertures mounted in the opening of each second end and a groove extending along its perimeter for positive engagement with said continuous edge thereby effectively sealing the opening;
   first and second collector tubes fittingly received respectively through the apertures in said plug and extending from outer ends positioned at locations outside of said container to inner ends positioned at locations within said container, the inner end of said first collector tube terminating nearer to the first end of said container than the inner end of said second collector tube; and
   a conduit connecting said second tube of one of said containers to said first tube of an adjacent one of said containers such that all of said containers in said matrix are thereby connected in a series relationship.

2. A solar collector matrix assembly as set forth in claim 1, including a plurality of first reflectors having an outer contour generally of pyramid shape at locations of alternating polygons on the surface of said support member, each of said first reflectors having a surface which is reflective of heat and light and arranged and positioned for directing solar radiation toward said containers.

3. A solar collector matrix assembly as set forth in claim 1, including second reflectors of a rounded outer contour mounted to said support member adjacent to its periphery for directing solar radiation toward said containers.

4. A solar collector matrix assembly as set forth in claim 1, including a plurality of first reflectors having an outer contour generally of pyramid shape at locations of alternating polygons on the surface of said support member, each of said first reflectors having a surface which is reflective of heat and light and arranged and positioned for directing solar radiation toward said containers;
   second reflectors of a rounded outer contour mounted to said support member adjacent to its periphery for directing solar radiation toward said containers; and
   a canopy mounted on said support member movable between a retracted position exposing to solar radiation said collector elements and said first and second reflectors and an extended position covering said collector elements and said first and second reflectors.

5. A solar collector matrix assembly as set forth in claim 1, including a plurality of first reflectors having an outer contour generally of pyramid shape at locations of alternating polygons on the surface of said support member, each of said first reflectors having a surface which is reflective of heat and light and arranged and positioned for directing solar radiation toward said containers;
   second reflectors of a rounded outer contour mounted to said support member adjacent to its periphery for directing solar radiation toward said containers; and
   a canopy mounted on said support member movable between a retracted position exposing to solar radiation said collector elements and said first and second reflectors and an extended position covering said collector elements and said first and second reflectors; drive means operatively connected with said canopy; and first sensing means responsive to the quality of solar radiation for energizing said drive means to move said canopy to the retracted position when the solar radiation received at said matrix is in excess of a predetermined value and for energizing said drive means to move said canopy to the retracted position when the solar radiation received at said matrix is less than a predetermined value.

6. A solar heating system for a structure comprising:
   a support member of generally flat sheet material having a substantially checkerboard design on its surface, alternating polygons thereof having circular holes formed therein whose outer circumferences are generally tangential to the perimeters of their associated polygons;
   a matrix of collector elements arranged on said support member in a series relationship including a plurality of cylindrical beverage containers of the convenient opening variety, each including a first end which is sealed and a second end having a continuous edge defining an opening therein, each of said containers being received within an associated hole and mounted on said support member, a longitudinal axis of each of said containers being transverse to a plane of said support member, and each of said containers having a coating of a heat and light conductive substance;
   a resilient plug having a pair of spaced apertures mounted in the opening of said second end and a groove extending along its perimeter for positive engagement with said continuous edge thereby effectively sealing the opening;

first and second collector tubes fittingly received respectively through the apertures in said plug and extending from outer ends positioned at locations outside of said container to inner ends positioned at locations within said container, the inner end of said first collector tube terminating nearer to the first end of said container than the inner end of said second collector tube;

a conduit connecting said second tube of one of said containers to said first tube of an adjacent one of said containers such that all of said containers in said matrix are thereby connected in a series relationship;

a reservoir for storing a fluid therein;

a fluid supply line connecting said reservoir and a first of said collector tubes at a first of said containers in said matrix;

a fluid return line connecting said reservoir to a second of said collector tubes at a last of said containers in said matrix; and pump means for circulating the fluid from said reservoir through said system and for return to said reservoir.

7. A solar heating system as set forth in claim 6, including a first fluid by-pass line connected at its opposite ends to said fluid supply line and to said fluid return line, respectively, said first by-pass line being in a parallel flow relationship with said matrix; a first valve operatively joining said first by-pass line and said supply line movable between a first position connecting said supply line to said matrix while disconnecting said first by-pass line from said supply line, and a second position connecting said supply line to said first by-pass line while disconnecting said matrix from said supply line; a second valve spaced from said first valve operatively joining said first by-pass line and said return line and movable between a first position connecting said matrix to said return line while disconnecting said first by-pass line from said return line, and a second position connecting said first by-pass line to said return line while disconnecting said matrix from said return line; and wherein said first sensing means is responsive to the quality of solar radiation for moving said first and second valves to their first positions when the solar radiation received at said matrix is in excess of a predetermined value and for moving said first and second valves to their second positions when the solar radiation received at said matrix is less than a predetermined value.

8. A solar heating system as set forth in claim 6, including radiating means connected in a series relationship with said fluid supply line between said reservoir and said matrix; a second fluid by-pass line in a parallel relationship with said radiating means; third and fourth valves operatively joining at spaced locations said second by-pass line and said radiating means to said supply line, said third and fourth valves being movable between a first position connecting said radiating means to said supply line in a series relationship between said matrix and said reservoir while disconnecting said second by-pass line from said supply line, and a second position connecting said second by-pass line to said supply line in a series relationship between said matrix and said reservoir while disconnecting said radiating means from said supply line; and second sensing means responsive to air temperature within the structure for moving said third and fourth valves to their first position when the ambient temperature within the structure is below a predetermined value and for moving said third and fourth valves to their second position when the ambient temperature within the structure is above a predetermined value.

* * * * *